No. 735,494. PATENTED AUG. 4, 1903.
J. W. GAYNER.
GAS PRODUCER.
APPLICATION FILED SEPT. 18, 1902.
NO MODEL.
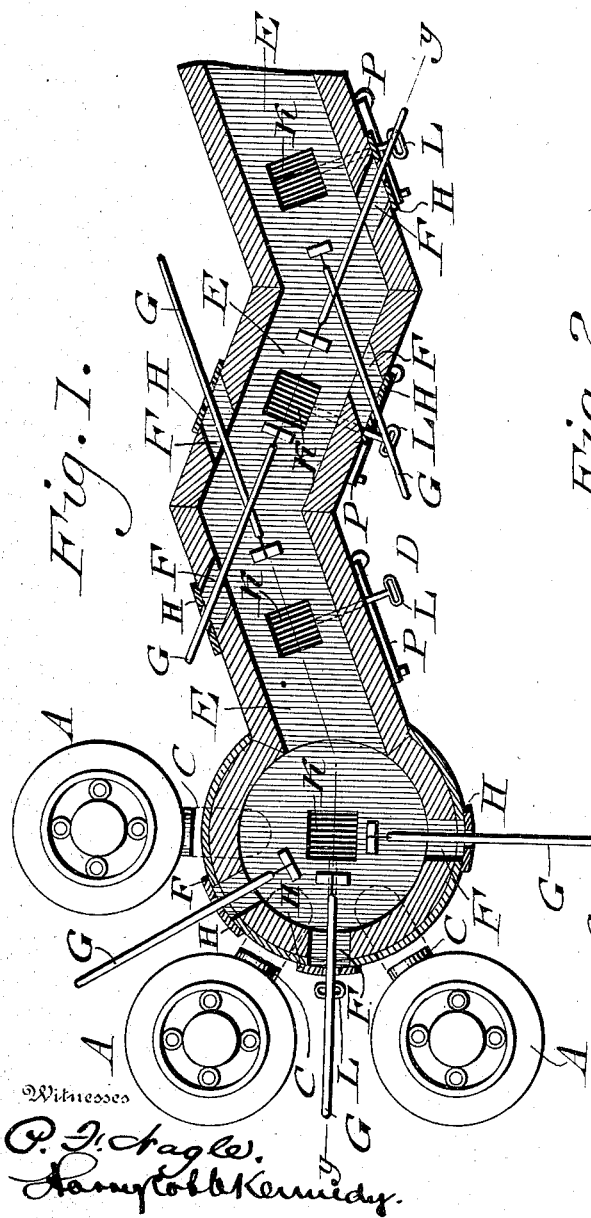
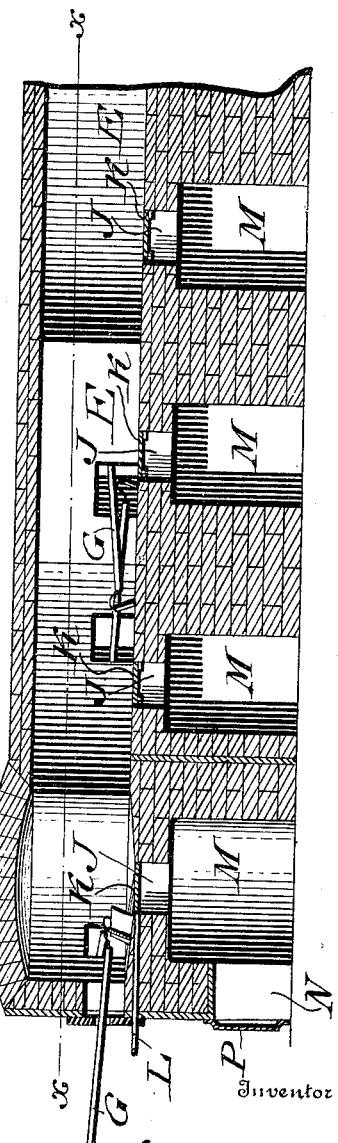

No. 735,494. Patented August 4, 1903.

UNITED STATES PATENT OFFICE.

JOHN WILLIAM GAYNER, OF SALEM, NEW JERSEY, ASSIGNOR TO AMERICAN PRODUCER-GAS FURNACE COMPANY, A CORPORATION OF NEW JERSEY.

GAS-PRODUCER.

SPECIFICATION forming part of Letters Patent No. 735,494, dated August 4, 1903.

Application filed September 18, 1902. Serial No. 123,811. (No model.)

*To all whom it may concern:*

Be it known that I, JOHN WILLIAM GAYNER, a citizen of the United States, residing in the city and county of Salem, State of New Jersey, have invented a new and useful Improvement in Gas-Producers, of which the following is a specification.

My invention consists of a novel construction of gas-producers and conduits for leading gas therefrom, and it is designed to afford means for removing soot and accumulations within said conduits without shutting down the gas-producer.

The invention further consists in the details of construction hereinafter fully described and specifically claimed.

Figure 1 represents a horizontal section on line $x\ x$ of a gas-producer plant constructed in accordance with my invention. Fig. 2 represents a vertical section thereof, taken on line $y\ y$.

Similar letters of reference indicate corresponding parts in the figures.

Referring to the drawings, A designates gas-producers that communicate with the common vault or compartment B by means of pipes C. From the vault B extends the conduit D, the latter being composed of offset sections E, which in the instance illustrated are angular or zigzag.

In United States Letters Patent No. 645,719, granted to me on the 20th day of March, 1900, I have shown means for removing soot from gas-producer conduits without shutting down the gas-producer, and my present invention is an improvement thereon and is designed to allow the soot to be readily removed without regard to the length of conduit extending from the producers to the place of consumption. It is of course understood that in very long straight conduits it might not be practicable to manipulate the hoe or scraper with a handle of sufficient length to reach the entire length of the conduit. To overcome this, I make the conduit D in offset sections E, each section being of convenient length to make it practicable to manipulate a scraper throughout the entire length. In the drawings I have shown what is known as an "underground" conduit and a battery of the gas-producers A leading to the vault B. From this vault the sections E extend in zigzag fashion, so that by making openings, as F, in the side of the conduit the hoe G may be manipulated therethrough to clean out the adjacent section. These openings F are closed by plates H, having apertures through which the handles of the hoes G extend, and when the hoes are not in use they may be withdrawn, so that they stand in the openings F and out of the conduit. The vault B is also provided with openings F, closed by plates H, through which hoes G may be manipulated. The vault and each section E of the conduit are provided with outlet-openings J, having valves K, that are manipulated from the outside by stems L. These openings J communicate with compartments M, situated beneath the vault B and conduit D, and access is had to the compartments M through openings N, that are closed by doors P.

The operation is as follows: When the plant is in operation, the hoes G are withdrawn into the openings F, and the valves K and the doors P are closed. When the accumulated soot is to be removed, the valves K are first opened, and then the hoes are manipulated to scrape the soot into the openings J, through which it falls into compartments M. The valves K are then closed and the doors P opened and the soot removed from the compartments M. It is seen that this operation can be carried on without affecting the operation of the plant, and by reason of the offset or zigzag section of the conduit it is immaterial how far the gas has to be led from the producers to the place of consumption, since the sections may be made of a length that will make it practicable to employ a hoe in scraping out the same.

Having thus described my invention, what I claim as new, and desire to secure by Letters Patent, is—

1. A conduit for conveying gas from a gas-producer, consisting of horizontal angular sections forming a continuous conduit, said sections being provided with outlet-openings, and independent means in each section for conveying the accumulations to said outlet-openings.

2. A conduit for conveying gas from a gas-producer, consisting of substantially horizontal angular sections forming a continuous conduit, said sections being provided with outlet-openings, and independent scraping devices in said sections provided with handles extending through openings in the walls of the adjacent sections.

3. A conduit for conveying gas from a gas-producer, consisting of substantially horizontal angular sections, each of which is provided with an outlet-opening between the ends thereof, openings in the side walls of said sections situated opposite the ends of an intermediate section, and scraping devices situated in each section and having handles extending through said openings.

4. The combination with a plurality of gas-producers, of a vault communicating therewith, an outlet-opening in the bottom of said vault, and means within said vault operated from the exterior of said vault for conveying accumulations in the bottom of said vault into said opening.

5. The combination with a plurality of gas-producers, of a vault communicating therewith and provided with a valved outlet-opening, a compartment below said vault provided with a valved outlet, and scrapers situated within said vault and provided with handles extending through openings in the side thereof.

6. A conduit for conveying gas from gas-producers, consisting of substantially horizontal angular sections, each of said sections being provided with a valved outlet-opening between the ends thereof, compartments communicating with each of said outlet-openings and having valved outlet-openings, and scrapers situated in said sections and provided with handles extending through openings in the side walls of adjacent sections.

7. A conduit for conveying gas from gas-producers, consisting of substantially horizontal zigzag sections provided with outlet-openings, and independent means for conveying accumulations in said sections to said outlet-sections.

J. WILLIAM GAYNER.

Witnesses:
S. L. RICHMOND,
E. J. RICHMOND.